Figure 1:
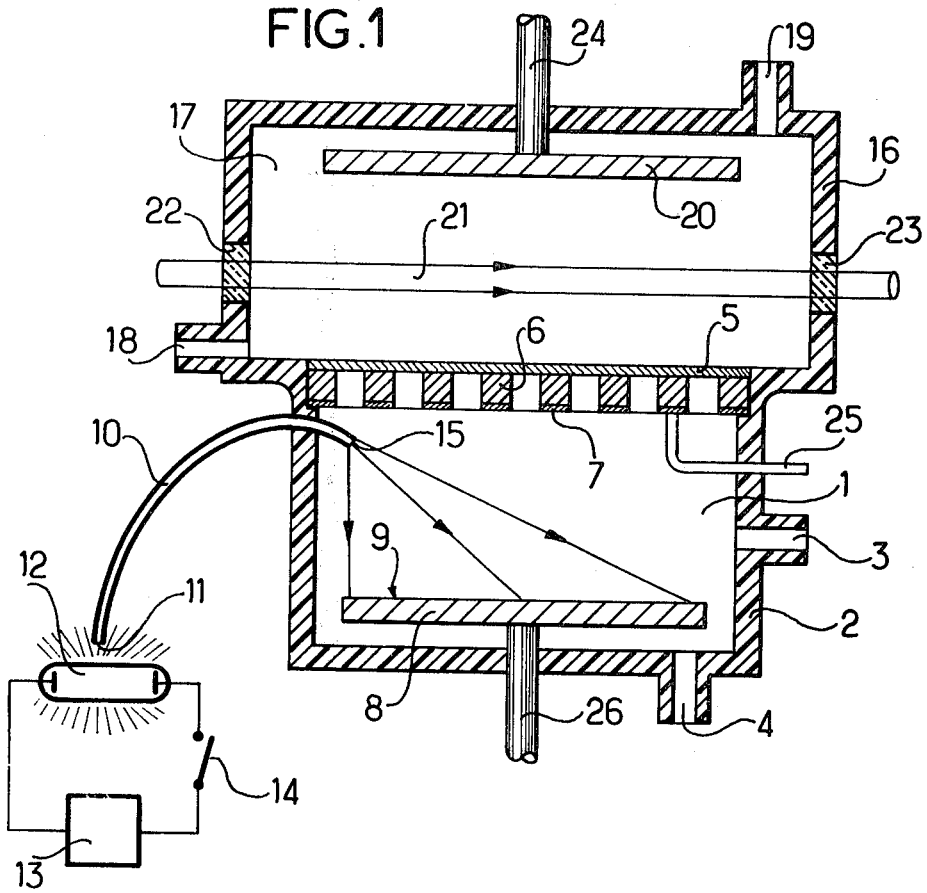

United States Patent [19]
Duchet

[11] 3,972,009
[45] July 27, 1976

[54] ELECTRON BEAM GENERATOR AND GAS LASER HEAD IN COMBINATION THEREWITH

[75] Inventor: Michel Duchet, Briis-sur-Orges, France

[73] Assignee: Compagnie Generale d'Electricite, Paris, France

[22] Filed: Mar. 13, 1975

[21] Appl. No.: 558,113

[30] Foreign Application Priority Data
Apr. 4, 1974 France .............................. 74.11991

[52] U.S. Cl. ............................. 331/94.5 PE; 330/4.3
[51] Int. Cl.² ........................................... H01S 3/09
[58] Field of Search ..................... 331/94.5; 330/4.3

[56] References Cited
UNITED STATES PATENTS
3,789,319 1/1974 Rhodes ....................... 331/94.5 PE

OTHER PUBLICATIONS

Crocker et al., Pulsed Amospheric-Pressure Carbon-Dioxide Laser Initiated by a Cold-Cathode Glow-Discharge Electron Gun, Elect. Lett. vol. 8, No. 18, (Sept. 1972), pp. 460–461.

*Primary Examiner*—William L. Sikes
*Attorney, Agent, or Firm*—Haseltine, Lake & Waters

[57] ABSTRACT

Electron beam generator and the applying of such a generator to a gas laser head comprising, more particularly, an anode and a cathode arranged in an enclosure under low pressure; it comprises, moreover, a device for lighting up the cathode by ultra-violet radiation. The generator can be applied to the ionizing of the gaseous mixture of a gas laser generator.

6 Claims, 2 Drawing Figures

ELECTRON BEAM GENERATOR AND GAS LASER HEAD IN COMBINATION THEREWITH

The invention concerns an electron beam generator and the applying of such a generator to a gas laser head. The term "laser head" means, in the following text, either a laser amplifier head comprising only an active medium connected with means for exciting that medium, or a laser emitter head comprising moreover an optical resonant cavity in which is arranged the active medium.

An electron beam generator comprising an enclosure containing a gas at low pressure, an anode having a thin metallic sheet forming a part of the wall of the enclosure and a metallic cathode arranged in the enclosure is known. When an electric potential which is positive in relation to the cathode is applied to the anode, a flux of electrons goes from the cathode towards the anode and crosses the sheet to form an electron beam. It is observed that there is a delay between the applying of the voltage and the output of the beam and that this delay varies in a random manner from one operation to another. The variation of that delay causes disadvantages in certain applications.

A known application of such an electron beam generator consists in combining that generator with a gas laser head. That laser head, for example an amplifying head, comprises, on the one hand, an anode and a cathode, between which is set up a difference in potential and, on the other hand, a gaseous mixture arranged between the anode and the cathode, the mixture being composed of carbon dioxide, helium and nitrogen. The generator is arranged in the vicinity of the gaseous mixture so that the electron beam which it emits will set up an ionization in the mixture. That ionization causes, between the electrodes of the laser head, an electric discharge capable of exciting the gaseous mixture to amplify a laser pulse emitted by a laser oscillator.

It is then observed that, subsequent to the uncertainty concerning the duration of the delay between the applying of the potential to the electrodes of the generator and the emitting of the electron beam, it is difficult to synchronize the excitation of the gaseous mixture with the passing of the laser pulse.

The present invention has as its object the producing of an electron beam generator and a laser head not having the above-mentioned disadvantages.

The present invention has as its object an electron beam generator comprising an enclosure containing a gas at low pressure, an anode having a metallic sheet which is impermeable to the gas, forming a part of the wall of the said enclosure, a metallic cathode one of whose faces, contained in the enclosure, is situated facing the said anode, means for applying to the anode a positive electric potential in relation to the cathode so as to set up a flux of electrons going from the cathode towards the metallic sheet, the latter being sufficiently thin to allow a part of the flux to pass and hence form the electron beam. According to the invention the generator further comprises means for the said face of the cathode facing the anode to be lit up by an ultra-violet radiation at the moment of the applying of the potential.

The present invention also has as its object a laser head comprising a gaseous mixture constituted by carbon dioxide, helium and nitrogen, an anode and a cathode arranged in that gaseous mixture, means for applying to that anode an electric potential which is positive in relation to that cathode, and means for ionizing the gaseous mixture, constituted by the electron beam generator. This electron beam generator is preferably a generator such as defined in the above paragraph, the cathode of the laser head being constituted by the anode of the generator, the anode of the laser head and the cathode of the generator being arranged on either side of the cathode of the laser head.

Figure 2:
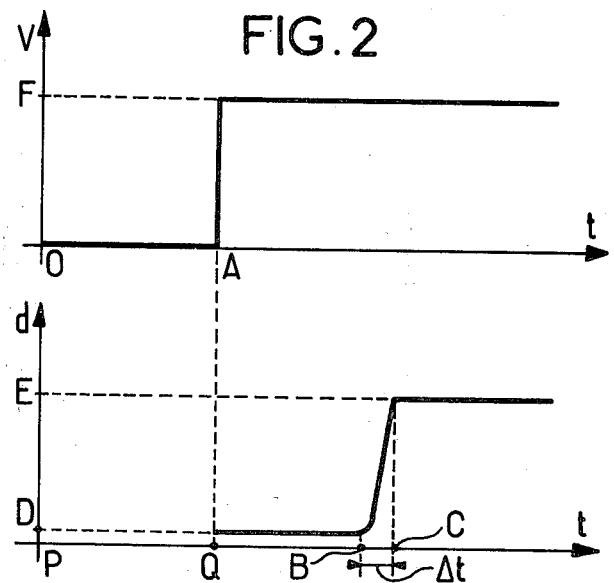

The present invention will be better understood from the following description given with reference to the accompanying drawing by way of an illustration having no limiting character, in which:

FIG. 1 shows diagrammatically an embodiment of an electron beam generator combined with a gas laser head; and FIG. 2 shows a diagram making it possible to understand the operation of the generator shown in FIG. 1.

FIG. 1 shows an electron beam generator comprising an enclosure 1 limited on the one hand by a casing 2, made, for example, of a plastic substance, provided with two openings 3 and 4 and, on the other hand, by an anode of that generator comprising a thin metallic sheet 5, for example made of titanium, whose thickness is in the order of 15 microns. The anode comprises, moreover, a metallic grid 6, for example made of aluminum, on one of whose faces the sheet 5 rests. The grid 6 is arranged on the inside of the enclosure 1 and its edges are fixed on the internal wall of that enclosure.

The other face of the grid is preferably covered by a thin layer 7 of a metal having a high atomic number, such as gold. A cathode 8, which is, for example, rectangular, made of a metal such as an alloy of aluminium, is arranged opposite the anode and on the inside of the enclosure 1. The face 9 of the cathode 8 placed facing the anode can be lit up by an ultra-violet radiation source by means of a device comprising at least one light conductor 10 such as a rod made of very pure quartz, crossing the wall of the enclosure 1, for example in the vicinity of the grid 6 of the anode.

The end 11 of the conductor 10 on the outside of the enclosure 1 is arranged in the vicinity of an ultra-violet light source such as a xenon flash tube 12 whose electrodes are connected to an electric source 13 through a switch 14. To ensure homogeneous lighting up of the face 9 of the cathode 8, generally, several light conductors such as 10 are used whose ends 15 inside the enclosure 1 are distributed regularly in relation to a plane of symmetry perpendicular to the cathode 8.

The casing 2 of the enclosure 1 is extended beyond the sheet 5 to form a casing 16 limiting with the sheet 5 a chamber 17 of a carbon dioxide laser amplifier head operating in the pulse mode. The casing 16 is provided with two openings 18 and 19 to enable respectively the letting in and letting out of gas in the laser. An anode 20 of the laser head is arranged inside the chamber 17 opposite the sheet 5, the cathode of the laser head being constituted by the anode of the electron beam generator. Thus, the anode 20 of the laser head and the cathode 8 of the generator are arranged on either side of the cathode of the laser head.

A laser pulse 21 to be amplified, coming from a laser oscillator, not shown, can enter the laser head by means of a window 22 of the casing 16; the pulse crosses the chamber 17 between the anode 20 and the sheet 5 and leaves that chamber through a window 23 of the casing 16.

The operation of the device shown in FIG. 1 is as follows: A mixture of carbon dioxide, helium and nitrogen at atmospheric pressure is made to flow in the chamber 17 and an electric potential which is positive in relation to the cathode of the laser through a connection 25, connected to the cathode and crossing the wall 2, is applied to the anode 20 of the laser head through a connection 24 connected to the anode and crossing the wall 16.

A vacuum is set up in the enclosure 1 of the electron beam generator by sucking out the air through the opening 4 by means of a pumping device (not shown) and a very small quantity of a gas such as helium is allowed to enter that enclosure through the opening 3, the pressure of the helium in the enclosure 1 being in the order of 0.05 torrs.

Then, the switch 14 is closed so as to cause a light discharge in the tube 12. At that instant, an electric potential which is positive in relation to its cathode 8 is applied, to the anode of the electrode beam generator through a connection 26 connected to the cathode and crossing the casing 2. The applying of the voltage is effected preferably a little before the light intensity caused by the discharge of the tube 12 has reached its maximum value.

An electron flux, a part of which crosses the sheet 5 so as to form a beam capable of ionizing the gaseous mixture contained in the chamber 17, is then set up in the space comprised between the anode of the electron beam generator and its cathode 8. The ionizing causes the setting up of an electrical discharge between the anode 20 of the laser head and its cathode, the discharge being suitable for amplifying the laser pulse 21 crossing the laser head at that instant.

FIG. 2 is a graph making it possible to realize more precisely the phenomena caused by the applying of the voltage on the electrodes of the electron beam generator. The graph comprises, on the one hand, a curve $OtV$ representing the variation of the voltage $V$ applied to these electrodes as a function of time $t$ and, on the other hand, a curve $Ptd$ representing the variation as a function of time $t$ of the density $d$ of the current which originates between the electrodes of the generator at the time of the applying of that voltage.

At the instant represented by the points A and Q on the graph, the voltage OF is applied to the electrodes of the generator. A very slight current is then set up instantaneously between the electrodes, that current corresponding to the density:

$$do = PO.$$

The current remains substantially constant during a time QB which then increases rapidly during a rising time:

$$\Delta t = BC$$

until a value corresponding to the current density:

$$d2 = PE$$

is obtained after a delay time:

$$T = QC.$$

The current corresponding to the density $d2$ forms an electron beam capable of ionizing the gas mixture in the laser head.

If the electron beam generator does not comprise any lighting up device for the cathode of the generator by an ultra-violet radiation, as is the case in generators according to the prior art, the delay time T can be relatively long, for example in the order of 20 microseconds, it being possible for the duration of that delay to vary from one operation to another by more or less one microsecond. The value of T is given for a voltage OF of 100,000 volts and a distance between the electrodes of the generator of 10 centimeters approximately, the value of $do$ being in the order of $10^{-10}$ A/sq. cm.

On the other hand, if, as is the case in the generator illustrated in FIG. 1, the cathode of the generator is lit up by an ultra-violet radiation, T is reduced to about 10 microseconds, the duration of that delay possibly varying by more or less 0.1 microsecond, all other things remaining equal.

The current density $do$ is set up at a slightly higher level, $10^{-5}$ A/sq.cm., this not being a hindrance in practice.

The electron beam generator according to the invention therefore has several advantages. Firstly, the duration of the delay T is reduced and, more especially, the amplitude of the fluctuations of that delay from one operation to another are considerably decreased. Lastly, it is observed that the applying of a layer of a metal having a high atomic number on the grid of the anode of the generator makes it possible to decrease even further the amplitude of the fluctuations of the delay T.

When the electron beam generator is applied to a gas laser head, the decrease of the amplitude of the fluctuations of the delay T facilitates the synchronizing of the excitation of the gaseous mixture with the passing of the laser pulse to be amplified.

I claim:

1. An electron beam generator comprising: an enclosure having a wall and containing a gas at low pressure; a first anode having a metallic sheet which is impermeable to the gas, forming part of said enclosure wall; a first metallic cathode contained in the latter, one of the faces of said cathode being situated facing said anode; means for applying to said anode a positive electric potential in relation to said cathode so as to set up a flux of electrons going from said cathode towards said metallic sheet, the latter being sufficiently thin to allow part of the flux to pass and hence form the electron beams; and means for illuminating said one face of the cathode that faces said anode by a source of ultra-violet radiation at the moment of the applying of the potential.

2. The generator as defined in claim 1, wherein said illuminating means includes a lamp situated outside said enclosure and at least one guide for light crossing said enclosure wall, the input of said guide receiving the light of said lamp, the output of said guide being arranged in said enclosure in the vicinity of said anode so as to light up said one face of the cathode.

3. The generator as defined in claim 1, wherein said anode further includes a metallic grid arranged against said metallic sheet inside said enclosure to support said metallic sheet.

4. The generator as defined in claim 3, wherein said grid includes a layer of a metal, having a high atomic number, on its face opposite said cathode.

5. The generator as defined in claim 4, wherein said metal with a high atomic number is gold.

6. A laser head comprising an electron beam generator as defined in claim 1, said first anode constituting for the laser head a second cathode, a second anode for the laser head, the latter anode and said first cathode being arranged on either side of said first anode; a gaseous mixture constituted by carbon dioxide, helium and nitrogen, arranged between said second anode and said second cathode, the generator being able to ionize the gaseous mixture, and means for applying to said second anode an electric potential which is positive in relation to said second cathode.

* * * * *